UNITED STATES PATENT OFFICE 2,673,849

SUBSTITUTED THIOBARBITURIC ACIDS AND SALTS THEREOF

Wilbur J. Doran, Indianapolis, Ind., assignor to Eli Lilly and Company, Indianapolis, Ind., a corporation of Indiana No Drawing. Application June 2, 1952, Serial No. 291,309

5 Claims. (Cl. 260—260)

This invention relates to barbituric acids and more particularly to certain 5,5-disubstituted 1-alkyl-2-thiobarbituric acids and salts thereof, and their preparation.

The compounds of the present invention may be represented by the formula

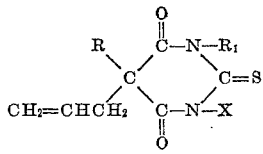

wherein R is a member of the group consisting of 2-methylbutyl and sec-butyl radicals, and when R is a 2-methylbutyl radical, $R_1$ is an ethyl radical, and when R is a sec-butyl radical, $R_1$ is an allyl radical; and X represents hydrogen when the compound is an acid, and represents a metallic or metallic-like radical when the compound is a salt.

The 5,5-disubstituted 1-alkyl-2-thiobarbituric acids of this invention are insoluble in water and soluble in the common organic solvents. The salts of the new substituted 1-alkyl-2-thiobarbituric acids are generally soluble in water and alcohol, and insoluble in most organic solvents.

The new compounds have utility as hypnotics and anesthetics, and are particularly valuable in that they are characterized by an unusually short hypnotic action. Compounds with extremely short action such as is displayed by the compounds of this invention have long been sought, since they would be especially useful in connection with minor surgical measures.

The substituted 1-alkyl-2-thiobarbituric acids can be prepared by alternative procedures. Thus, for example, a diester of an appropriately substituted malonic acid can be condensed with an N-alkylthiourea in the presence of an alkaline catalyst such as sodium ethoxide or the like, to form the desired substituted 1-alkyl-2-thiobarbituric acid. Alternatively, an appropriately substituted cyanoacetic ester can be condensed with N-alkylthiourea to form the correspondingly substituted imino-2-thiobarbituric acid, which is then hydrolyzed with a mineral acid to remove the imino group and produce the desired 1-alkyl-2-thiobarbituric acid.

Salts of the thiobarbituric acids of this invention are readily prepared by the usual methods of the art, as, for example, by interreaction of stoichiometric quantities of the selected acid and a base containing the desired metallic or metallic-like (i. e., substituted ammonium) cation, in a mutual solvent, followed by removal of the solvent to leave the salt as a residue. The preferred salts are the pharmaceutically useful salts, i. e. salts which are not substantially more toxic than the acids from which they are derived, and which can be incorporated in pharmaceutical extending media, liquid or solid, for the preparation of therapeutically useful compositions. Illustrative examples of suitable salts include those of the alkali metals, e. g. sodium and potassium, the alkaline earth metals, e. g. calcium, and the substituted ammonium radicals, e. g. ethanolamine, ethylenediamine, tetraalkyl ammonium hydroxide, and the like.

The following examples more specifically illustrate the preparation of the substituted 1-alkyl-2-thiobarbituric acids of the invention, and their salts.

EXAMPLE 1

Preparation of 1-ethyl-5-allyl-5-(2'-methylbutyl)-2-thiobarbituric acid.

To a solution of 10.6 g. of sodium in 220 ml. of absolute alcohol were added 119 g. of ethyl allyl-(2-methylbutyl) malonate [prepared as described by Volwiler and Tabern, J. Am. Chem. Soc.: 52, 1679, (1930)], and 42 g. of ethylthiourea. The mixture was refluxed for about 24 hours, and the reaction mixture, containing 1-methyl-5-ethyl-5-(2'-methylbutyl)-2-thiobarbituric acid formed in the reaction was cooled and poured over about 300 g. of solid carbon dioxide contained in a large beaker. After the carbon dioxide had substantially completely reacted, 1600 ml. of water were added to the mixture, and the oil which separated was extracted with 3 successive 300 ml. portions of ether. The combined ether extracts were extracted with 320 ml. of 5 percent aqueous sodium hydroxide, and the alkaline extract containing the sodium salt of the 2-thiobarbituric acid was acidified with dilute acetic acid. The 1-ethyl-5-allyl-5-(2'-methylbutyl)-2-thiobarbituric acid precipitated as an oil, and was removed by extraction with ether. The ether extract was dried over anhydrous magnesium sulfate, the ether was distilled off, and the residue was fractionally distilled in vacuo.

1-ethyl-5-allyl-5-(2'-methylbutyl)-2-thiobarbituric acid thus prepared boiled at about 130–132° C. at a pressure of 0.1 mm. of mercury.

*Analysis.*—Calculated for $C_{14}H_{22}N_2O_2S$: N, 9.92. Found: N, 9.67.

EXAMPLE 2

Preparation of the sodium salt of 1-ethyl-5-allyl-5-(2'-methylbutyl)-2-thiobarbituric acid.

25 g. of 1-ethyl-5-allyl-5-(2'-methylbutyl)-2-thiobarbituric acid were dissolved in 100 ml. of absolute ethanol and to the resulting solution was added gradually and with stirring an ethanol solution of sodium ethylate until the pH of the mixture was about 11.5. The reaction mixture was filtered and evaporated to dryness in vacuo and the residue, consisting of the sodium salt of 1 - ethyl - 5 - allyl - 5-(2'-methylbutyl)-2-thiobarbituric acid, was dried in a vacuum oven.

The potassium, calcium and ethanolamine salts are prepared in a similar manner, except that in the preparation of the substituted ammonium salts, care should be taken not to heat the salts to any appreciable degree during the drying operation, to avoid loss of the volatile ammonium base.

EXAMPLE 3

Preparation of 1,5-diallyl-5-sec-butyl-2-thiobarbituric acid.

To a solution of 10.6 g. of sodium in 230 ml. of absolute alcohol were added 140 g. of ethyl allyl sec-butyl malonate, [prepared by the method of V. H. Wallingford, M. A. Thorpe and A. H. Homeyer, J. Am. Chem. Soc., 64, 580 (1942)], and 58 g. of allyl thiourea, and the resulting solution was refluxed for 15 hours. The reaction mixture was cooled and poured over an excess of solid carbon dioxide. When the reaction mixture was neutral in reaction, it was treated with about 1400 ml. of water; an oily mixture resulted. The 1,5 - diallyl - 5 - sec-butyl - 2-thiobarbituric acid formed in the reaction was removed by extraction was three successive 300 ml. portions of ether. The combined ether extracts were extracted with about 1 liter of cold 2 percent sodium hydroxide solution. The aqueous solution of the sodium salt of the product was acidified with dilute acetic acid, and the 1,5 diallyl-5-sec-butyl-2-thiobarbituric acid was removed from the aqueous mixture by extraction with three successive 300 ml. portions of ether. The combined ether extracts were dried with anhydrous magnesium sulfate, the ether was distilled off, and the residue was fractionally distilled under reduced pressure.

1,5 - diallyl - 5-sec-butyl-2-thiobarbituric acid thus prepared boiled at 143–157° C. at a pressure of 0.27 mm. of mercury, and melted at 46–50° after three recrystallizations from dilute methanol.

EXAMPLE 4

Preparation of sodium 1,5-diallyl-5-sec-butyl-2-thiobarbiturate.

A solution of 0.44 g. of 1,5-diallyl-5-sec-butyl-2-thiobarbituric acid in 88 ml. of absolute alcohol was treated with a solution of 4 g. of sodium in 80 cc. of absolute alcohol until a test sample gave a pH of 11.5 using the glass electrode. The solution was filtered, evaporated to dryness and dried in vacuo. The residue was the sodium salt of 1,5-diallyl-5-sec-butyl-2-thiobarbituric acid.

I claim:

1. A member of the group consisting of a compound represented by the formula

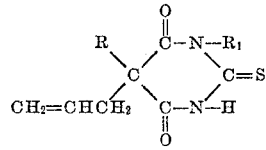

wherein R is a member of the group consisting of 2-methyl-butyl and sec-butyl radicals, and when R is a 2-methylbutyl radical, $R_1$ is an ethyl radical and when R is a sec-butyl radical, $R_1$ is an allyl radical; and the pharmaceutically useful salts thereof.

2. 1,5-diallyl-5-sec-butyl-2-thiobarbituric acid.

3. Sodium 1,5-diallyl-5-sec-butyl-2-thiobarbiturate.

4. 1 - ethyl-5-allyl-5-(2'-methylbutyl)-2-thiobarbituric acid.

5. Sodium 1-ethyl-5-allyl-5-(2'-methylbutyl)-2-thiobarbiturate.

WILBUR J. DORAN.

References Cited in the file of this patent

UNITED STATES PATENTS

| Number | Name | Date |
|---|---|---|
| 2,187,728 | Christiansen | Jan. 23, 1940 |

FOREIGN PATENTS

| Number | Country | Date |
|---|---|---|
| 605,567 | Germany | Nov. 13, 1934 |

OTHER REFERENCES

Tabern et al., J. Am. Chem. Soc., 57, 1961-3 (1935).